(12) United States Patent
Kulzer

(10) Patent No.: US 9,011,755 B2
(45) Date of Patent: Apr. 21, 2015

(54) EXERCISE STEP USING SPIRALLY SHAPED AIR-CUSHIONING LEGS

(71) Applicant: Darrell A. Kulzer, Denver, CO (US)

(72) Inventor: Darrell A. Kulzer, Denver, CO (US)

(73) Assignee: B&R Plastics, Inc., Denver, CO (US)

( * ) Notice: Subject to any disclaimer, the term of this patent is extended or adjusted under 35 U.S.C. 154(b) by 0 days.

(21) Appl. No.: 14/540,129

(22) Filed: Nov. 13, 2014

(65) Prior Publication Data

US 2015/0068017 A1    Mar. 12, 2015

Related U.S. Application Data

(62) Division of application No. 13/241,604, filed on Sep. 23, 2011.

(60) Provisional application No. 61/392,409, filed on Oct. 12, 2010.

(51) Int. Cl.
| | |
|---|---|
| *B29C 49/00* | (2006.01) |
| *A63B 22/00* | (2006.01) |
| *A63B 21/008* | (2006.01) |
| *A63B 23/04* | (2006.01) |

(52) U.S. Cl.
CPC .................................. *A63B 23/0458* (2013.01)

(58) Field of Classification Search
CPC ....................................................... A63B 22/18
USPC .............. 482/52, 53; 264/523, 541, 524, 531, 264/535, 248; 156/242
See application file for complete search history.

(56) References Cited

U.S. PATENT DOCUMENTS

| | | |
|---|---|---|
| 5,154,678 A | 10/1992 | Adamczyk et al. |
| 5,256,118 A | 10/1993 | Chen |
| 5,267,923 A | 12/1993 | Piaget et al. |
| D353,858 S | 12/1994 | Huang |
| 5,441,466 A | 8/1995 | Piaget et al. |
| 6,461,695 B1 | 10/2002 | Schaap |
| 7,052,449 B2 | 5/2006 | Chen |
| 7,160,229 B2 | 1/2007 | Park |
| 7,722,506 B2 | 5/2010 | Pratson et al. |
| 7,833,145 B2 | 11/2010 | Ko |
| 2010/0029443 A1* | 2/2010 | Kim ................................ 482/52 |
| 2012/0088642 A1 | 4/2012 | Kulzer |

* cited by examiner

*Primary Examiner* — Loan H. Thanh
*Assistant Examiner* — Rae Fischer
(74) *Attorney, Agent, or Firm* — William W. Cochran; Cochran Freund & Young LLC

(57) ABSTRACT

Disclosed are embodiments of an exercise step that utilize spirally shaped air-cushioning legs. The direction of the spiral of the air-cushioning legs is alternated around the periphery of the exercise step to eliminate rotational creep. Flow regulators are utilized to control the flow of air from the top of each of the air-cushioning legs into an interior portion of the base of the exercise step. Spokes provide an air flow passage between the air flow regulators and the central air regulator, as well as providing structural support for the base. Rings are also used around the base that inner connect the spokes and provide additional support. Recessed portions of a lower plate of the base are welded to an upper plate during a blow molding process to add additional support to the base of the exercise step.

1 Claim, 19 Drawing Sheets

EXERCISE STEP USING SPIRALLY SHAPED AIR-CUSHIONING LEGS

CROSS-REFERENCE TO RELATED APPLICATION

The present application is a divisional application of U.S. patent application Ser. No. 13/241,604, filed Sep. 23, 2011, by Darrell A. Kulzer, entitled "EXERCISE STEP USING SPIRALLY SHAPED AIR-CUSHIONING LEGS," which application claims the benefit of U.S. Provisional Application Ser. No. 61/392,409, filed Oct. 12, 2010, by Darrell A. Kulzer, entitled "EXERCISE STEP USING SPIRALLY SHAPED AIR-CUSHIONING LEGS," the disclosures of which are hereby incorporated herein by reference for all that they disclose and teach.

BACKGROUND

Exercise steps are a useful tool for physical conditioning. For example, exercise steps are used in step aerobic classes to increase aerobic activity of participants. Users can participate in step aerobic classes in health clubs, exercise clubs and individually while watching television or videos. Step aerobics not only increase aerobic activity of the participants, but are also useful in burning calories and weight reduction. Heart rates of participants can be increased by stepping on and off of the exercise step, which frequently results in improved physical conditioning of the participant. As a result, the popularity of exercise steps has increased since exercise steps provide a useful and convenient way to improve physical conditioning.

SUMMARY

An embodiment of the present invention may further comprise method of making an exercise step comprising: forming a plurality of clockwise air-cushioning legs comprising: forming a first sidewall having a clockwise spirally shaped bulge that allows the clockwise air-cushioning leg to compress when a user steps onto the exercise step; attaching a first non-slip cover to a bottom portion of the first sidewall to form an airtight seal with the bottom portion of the first sidewall; forming a first attachment plate that is connected to an upper portion of the first sidewall having latches for attaching the clockwise air-cushioning legs to the exercise step; forming a plurality of counterclockwise air-cushioning legs comprising: forming a second sidewall having a counterclockwise spirally shaped bulge that allows the counterclockwise air-cushioning leg to compress when a user steps onto the exercise step; attaching a second non-slip cover to a bottom portion of the second sidewall to form an airtight seal with the bottom portion of the second sidewall; forming a second attachment plate that is connected to an upper portion of the second sidewall having latches for attaching the counterclockwise air-cushioning legs to the exercise step; forming a base comprising: forming an upper plate from a parison in a blow molding process; forming a lower plate from the parison in the blow molding process comprising: forming a plurality of curved rings in the lower plate that provide circumferential support to the lower plate; forming a plurality of spokes in the lower plate that inter-connect the plurality of curved rings to provide lateral support to the lower plate, the plurality of spokes also providing a plurality of air flow passages; forming leg attachments in the lower plate that allow the latches on the first attachment plate and the second attachment plate to connect the air-cushioning legs to the lower plate with a substantially airtight seal; placing adjustable flow regulators on a first set of openings in the leg attachments that allow air in the clockwise air-cushioning legs and the counterclockwise air-cushioning legs, that is compressed when the user steps onto the exercise step, to be individually and separately controlled from the clockwise and counterclockwise air cushioning legs through the first set of openings in the leg attachments; placing an air control regulator in the lower plate that is communicatively coupled to the air flow passages that collectively controls air flow from the air flow passages; welding recessed portions of the lower plate to the upper plate to strengthen and form the air passages in the spokes; regulating air flow in the first set of openings and the second opening to control the rate of flow of the compressed air from the clockwise air-cushioning legs and the counterclockwise air-cushioning legs using the adjustable flow regulators and the air control regulator.

An embodiment of the invention may further comprise method of forming a spirally shaped air-cushioning leg comprising: providing an exterior mold having a spirally shaped leg portion for injection molding of the air-cushioning leg having a spiral shape; providing an interior mold that has a spiral shape; injecting a thermoplastic material between the exterior mold and the interior mold in an injection molding device to form an air-cushioning leg molded piece; unscrewing the interior mold from the air-cushioning leg molded piece formed between the exterior mold and the interior mold after the air-cushioning leg molded piece has cooled sufficiently to allow the interior mold to be removed; releasing the exterior mold to remove the spirally shaped air-cushioning leg.

DETAILED DESCRIPTION OF THE EMBODIMENTS

Figure 1:
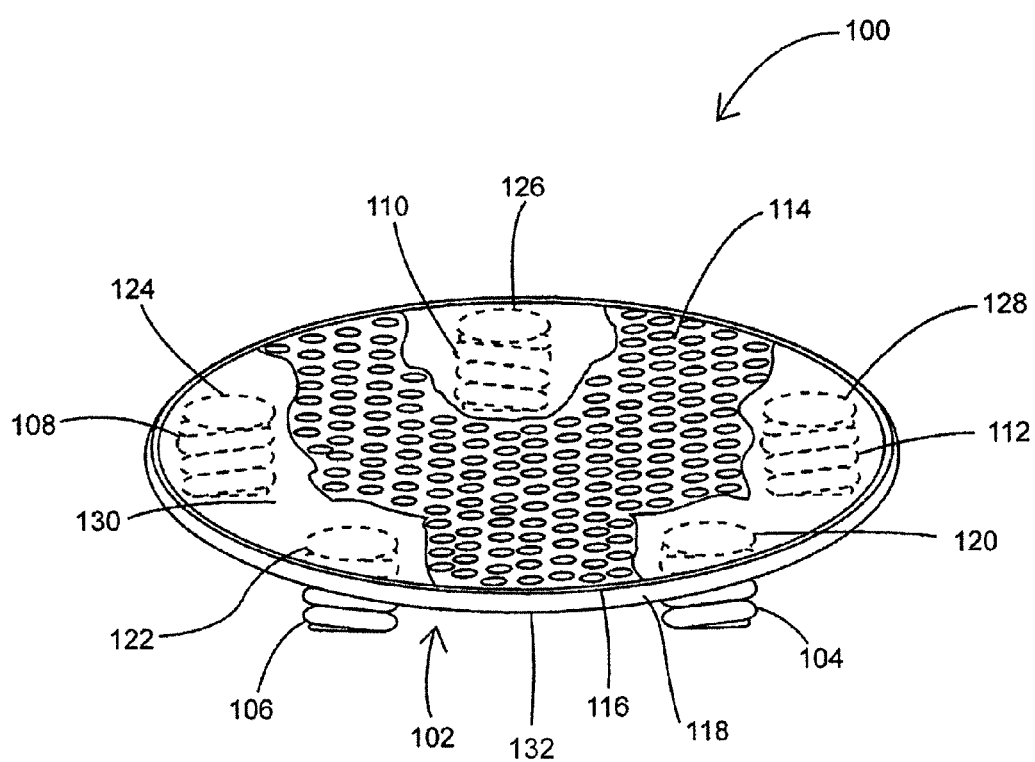
FIG. 1 is a schematic, perspective view of one embodiment of a round exercise step.

FIG. 1 is a schematic perspective view of an embodiment of a round exercise step 100. As illustrated in FIG. 1, base 102 has an upper plate 130, a lower plate 132 and a sidewall 118 that forms a lip 116 with the upper plate 130. The lip 116 is formed as a result of the upper plate 130 being recessed from the sidewall 118. The top surface 114 can be a layer of rubberized material that provides a friction surface so that users do not slip when stepping onto the top surface 114 of the exercise step 100. A layer of rubberized material also provides additional cushioning. When a layer of material is used as top surface 114, a flush surface is created with lip 116. Alternatively, the lip 116 can be eliminated and the upper plate 130 can be formed with a non-slip surface, such as a grating or other friction surface, to prevent users from slipping on the exercise step 100.

As also illustrated in FIG. 1, five air-cushioning legs are substantially evenly disposed around peripheral portions of the exercise step 100. Legs 104, 106, 108, 110, 112 are attached to the lower plate 132 in a manner that allows the legs 104-112 to be easily attached to, and removed from, the exercise step 100. Legs 104-112 can be removably attached and sealed to lower plate 132 to provide an airtight seal between the bottom plate 132 and the air-cushioning legs 104-112. Legs 104-112 are spirally shaped air-cushioning legs that compress when the user steps on the exercise step 100. Air-cushioning legs 104-112 provide cushioning for the user, to reduce stress on the knees, hips and back of the user of the exercise step 100 when stepping onto the exercise step 100. The air-cushioning legs 104-112 are spirally shaped and, as such, only have a single cushioning bulge that spirally progresses around the circumference of each of the legs 104-112. As shown in FIG. 1, the direction of the spiral is different for each of the adjacent legs, which reduces any rotary creeping of the exercise step 100, as disclosed in more detail below.

Figure 2:
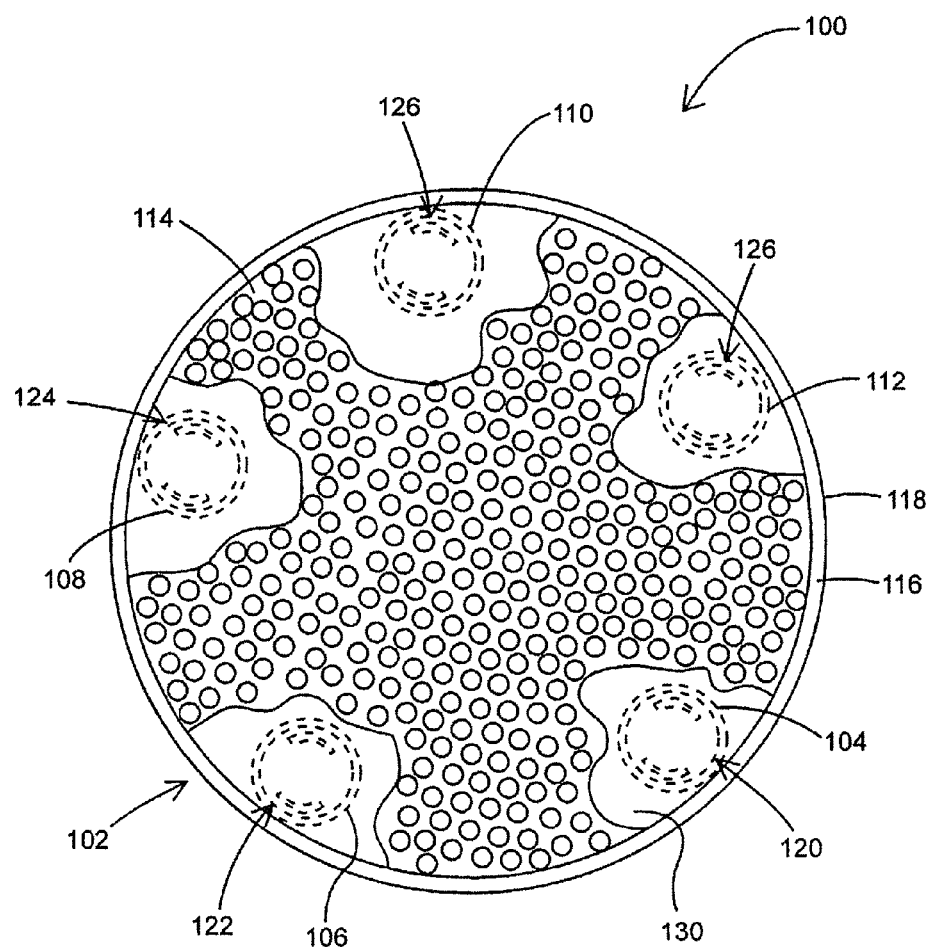
FIG. 2 is a top view of the embodiment of FIG. 1.

FIG. 2 is a top view of the embodiment of the round exercise step 100, illustrated in FIG. 1. As shown in FIG. 2, a cutaway portion of the top surface 114 is illustrated so that leg attachments and legs of the exercise steps 100 are illustrated. For example, legs 104, 106, 108, 110, 112 are shown as being substantially evenly spaced around the periphery of the exercise step 100. Each of the legs 104-112 is attached to the exercise step 100 by the leg attachments 120, 122, 124, 126, 128. The lip 116 provides an edge on the sidewall 118, so that the top surface 114 is flush with the sidewall 118. If a non-slip surface is formed in the top surface 114, a lip may not be included on sidewall 118. The round configuration illustrated in FIG. 2 allows the exercise step 100 to be constructed in a manner which provides strength, while minimizing the amount of plastic material used in the exercise step 100, as explained in more detail with respect to FIG. 3.

Figure 3:
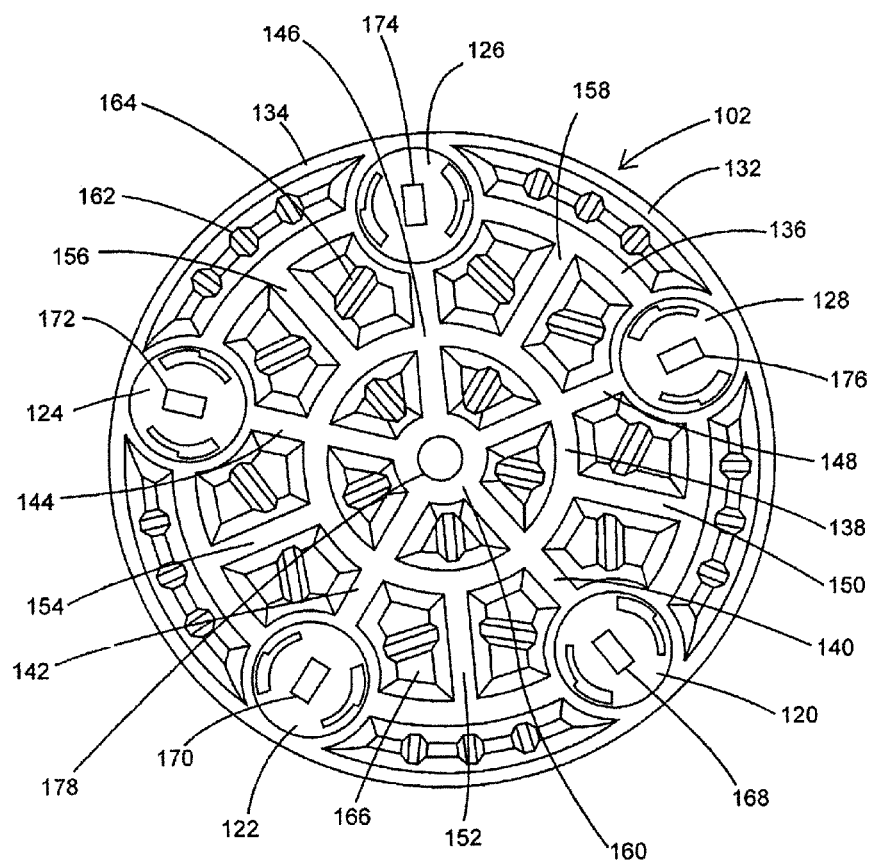
FIG. 3 is a bottom view of the base of the exercise step 100 illustrated in FIG. 1

FIG. 3 is a bottom view of the base 102 of the embodiment of the exercise step 100, illustrated in FIGS. 1 and 2. Base 102 includes the lower plate 132 that has a unique structural design that provides strength to the exercise step 100. For example, an outer ring 136 surrounds an inner ring 138, which provide structural support in a circumferential manner around the lower plate 132. In addition, the outer ridge 134 provides additional structural support around the periphery of the lower plate 132. Long spokes 140, 142, 144, 146, 148 connect the inner ring 138 to the center ring 160 to provide support between the center ring 160, the inner ring 138 and the leg attachments 120, 122, 124, 126, 128. Short spokes 150, 152, 154, 156, 158 connect the outer ring 136 to the inner ring 138 and provide support between the outer ring 136 and the inner ring 138. Various small attachment spokes, such as small attachment spokes 162, 164, provide additional support between the various rings and between the outer ring 136 and outer ridge 134. Recessed portions are formed in-between the rings and spokes, such as recessed portion 166. As explained in more detail below, the recessed portions are welded to the upper plate 130 during the blow molding process of forming the exercise step 100.

FIG. 3 also illustrates a series of flow regulators 168, 170, 172, 174, 176 that are disposed centrally in each of the leg attachments 120, 122, 124, 126, 128, respectively. The flow regulators 168-176 may simply comprise an opening that has a predetermined size to control the amount of air that flows from the air-cushioning legs 104-112 and the lower plate 132 or may comprise an adjustable valve. Further, the flow regulator may comprise a porous material that allows air to flow through an opening in the lower plate 132. In that regard, different porous materials can be used to adjust the amount of air flow through the flow regulators 168-176 by changing the porosity of the material. For example, foam-type material can be used, such as a foam rubber or a foam plastic material, which controls the amount of air flowing through the opening and also assists in reducing noise, such as whistling or other noises that may be created by the flow of air through the opening. Legs 104-112 can be constructed so that an airtight seal is created between an open portion of the upper part of each of the legs 104-112 and each of the leg attachments 120-128 on lower plate 132. Alternatively, or in addition to the flow regulators 168-176, a central air control regulator 178 can be placed in the center ring 160. The central air control regulator 178 can comprise an adjustable control valve to adjust the size of the opening of the central air control regulator 178. Alternatively, central air control regulator 178 may comprise an opening with a porous material disposed in the opening that controls the flow of air through the central air control regulator 178. Again, different types of porous materials can be used to control the amount of flow of air. Porous material can be mounted in a ring that snap fits into the center ring 160, or mounted in any desired manner, so that the central air control regulator 178 can be installed and removed easily by a user. The long spokes 140-148 provide an air passage for flow of air between flow regulators 168-176 and central air control regulator 178. Long spokes 140-148 provide a dual function of providing both a support structure for the lower plate 132 and an air channel between the leg attachments 120-128 and the center ring 160.

Figure 4:
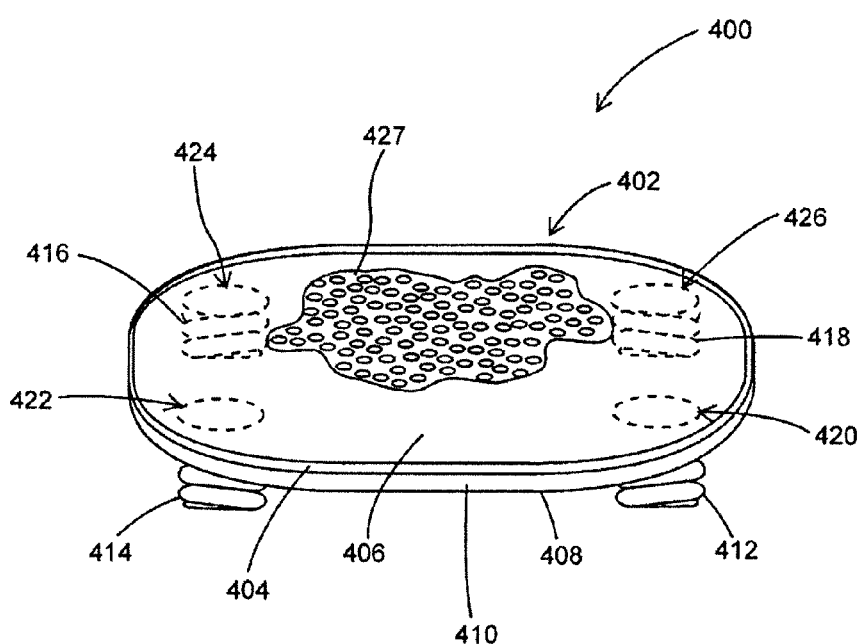
FIG. 4 is a schematic, perspective view of another embodiment of an oval shaped exercise step.

FIG. 4 is an illustration of another embodiment of an exercise step 400. Exercise step 400 is an oval-shaped exercise step that has four legs 412, 414, 416, 418. Each adjacent leg of the legs 412-418 has an oppositely oriented spiral. For example, leg 412 has a counterclockwise spiral, while leg 414 has a clockwise spiral. Leg 416 has a counterclockwise spiral and leg 418 has a clockwise spiral. The different directions of the spiral prevent any rotational creep of the exercise step 400 when the exercise step 400 is repeatedly stepped on and repeatedly compressed.

The exercise step 400, illustrated in FIG. 4, has a base 402 and a top surface 427 that is attached to the base 402. Top surface 427 provides a non-slip surface, which can either be a separate layer of material that is attached to the base 402, or can be a non-slip surface formed in the upper plate 406 of the base 402. The upper plate 406 is attached to the lower plate 408 and forms a sidewall 410 that provides structural support for the base 402. The upper and lower plates are attached during a blow molding process disclosed below with respect to FIGS. 13 and 14. The sidewall 410 forms an optional lip 404. When a separate top surface layer 427 is attached to the upper plate 406, the lip 404 is flush with the top surface 427. Legs 412-418 are attached to the lower plate 408 by way of leg attachments 420, 422, 424, 426, respectively.

Figure 5:
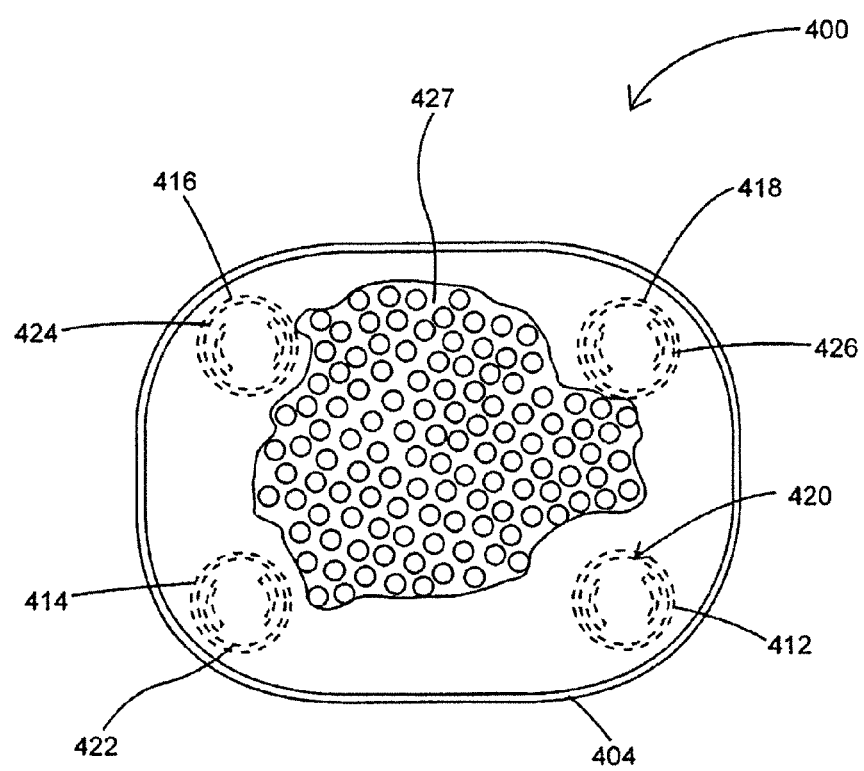
FIG. 5 is a top view of the embodiment of FIG. 4.

FIG. 5 is a top view of the oval-shaped exercise step 400 illustrated in FIG. 4. As illustrated in FIG. 5, legs 412-418 are spaced around the exercise step 400 to provide secure support to the exercise step 400. The legs 412-418 are attached to the exercise step 400 via the leg attachments 420, 422, 424, 426, respectively. A top surface 427 provides a non-slip surface on the top of the exercise step 400. The optional lip 404 provides a flush surface between the top surface 427 and the edge of the exercise step 400 to prevent tripping by the user and damage to top surface 427.

Figure 6:
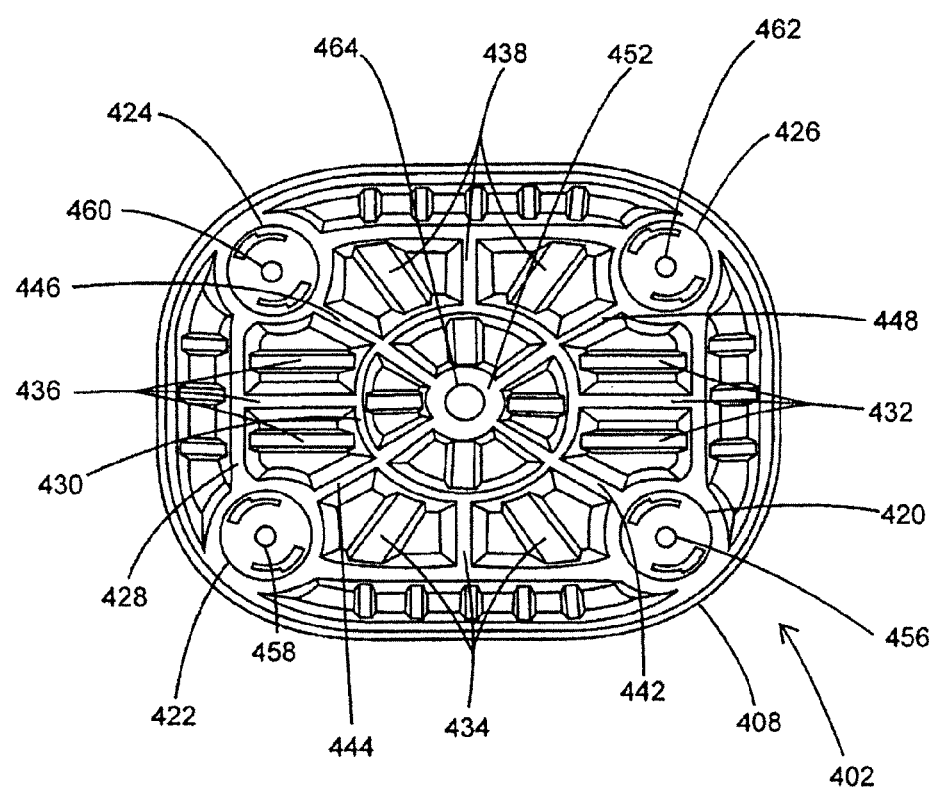
FIG. 6 is a bottom view of the base of the exercise step of FIG. 4.

FIG. 6 is a bottom view of the base 402 of the exercise step 400 of FIGS. 4 and 5, illustrating the structure of the lower plate 408. Lower plate 408 is similar to the lower plate 132 illustrated in FIG. 3, with the exception that lower plate 408 is shaped in an oval pattern. The leg attachments 420-426 are formed in the lower plate 408 and provide an airtight seal between the lower plate 408 and the air-cushioning legs 412-418. Flow regulators 456, 458, 460, 462, allow air that is compressed, as a result of the compression of the air-cushioning legs 412-418 during use, to flow through the flow regulators 456-462. The compressed air flows through the long spokes 442, 444, 446, 448 to the center ring 452 and out of the base 402 via central air control regulator 464. Flow regulators 456-462 and central air control regulator 464 can comprise the same types of valves as described with respect to FIG. 3. Again, structural support is provided to the base 402 by the series of long spokes 442-448, short spokes 432, 434, 436, 438, inner ring 430, outer ring 428, and center ring 452. In addition, various small spokes are used in the same manner as utilized in FIG. 3 to provide additional support. Long spokes 442-448 provide a dual function of providing both a support structure for the lower plate 408 and an air channel between the leg attachments 420-426 and the center ring 452.

Figure 7:
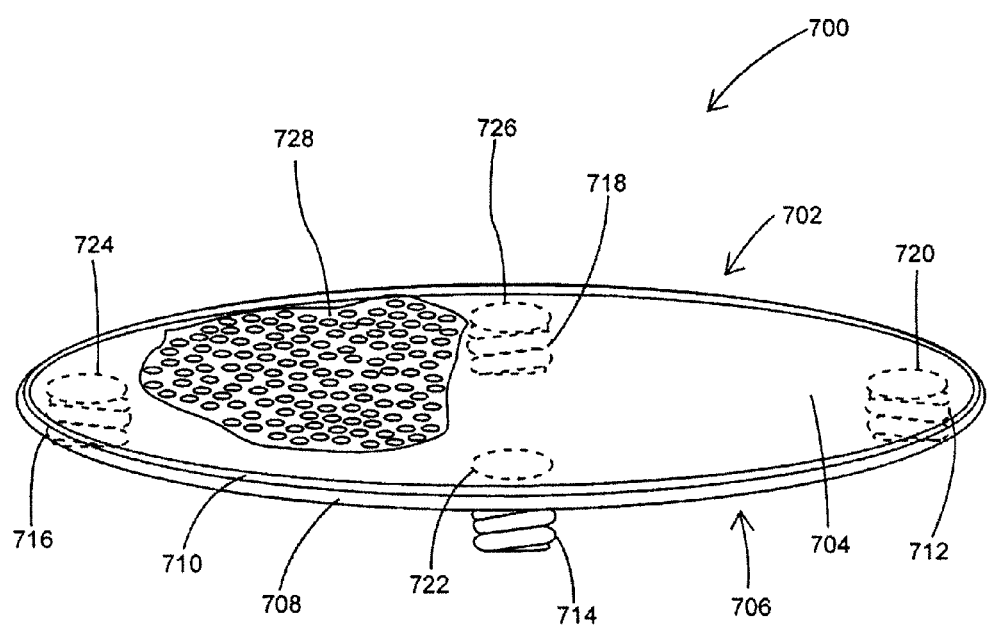
FIG. 7 is a schematic, perspective view of another embodiment of an oval exercise step.

FIG. 7 is a schematic perspective view of another embodiment of an exercise step 700. As illustrated in FIG. 7, base 702 has an oval shape that is different from the oval shape illustrated in FIGS. 3-6. Exercise step 700 has four legs 712, 714, 716, 718 that are attached to the lower plate 706 of base 702. Sidewall 708 provides a continuous surface between the upper plate 704 and lower plate 706, which provides additional support to the base 702. Sidewall 708 forms a lip 710 that extends upwardly from the level of the upper plate 704. Top surface 728 can be a separate layer of material that is attached to the upper plate 704 to provide a non-slip surface for the exercise step 700. Lip 710 provides a flush surface between the top portion of the top surface 728 and the sidewall 708. As also illustrated in FIG. 7, leg attachments 720, 722, 724, 726 are disposed on the lower plate 706 so that the legs 712-718 can be attached to the lower plate 706 with an airtight seal. The legs 712-718 are air-cushioning legs that compress when a user steps onto the exercise step 700. The air-cushioning is provided by a single spiral bulge that forms the sidewall of the air-cushioning leg, as disclosed in more detail below.

Figure 8:
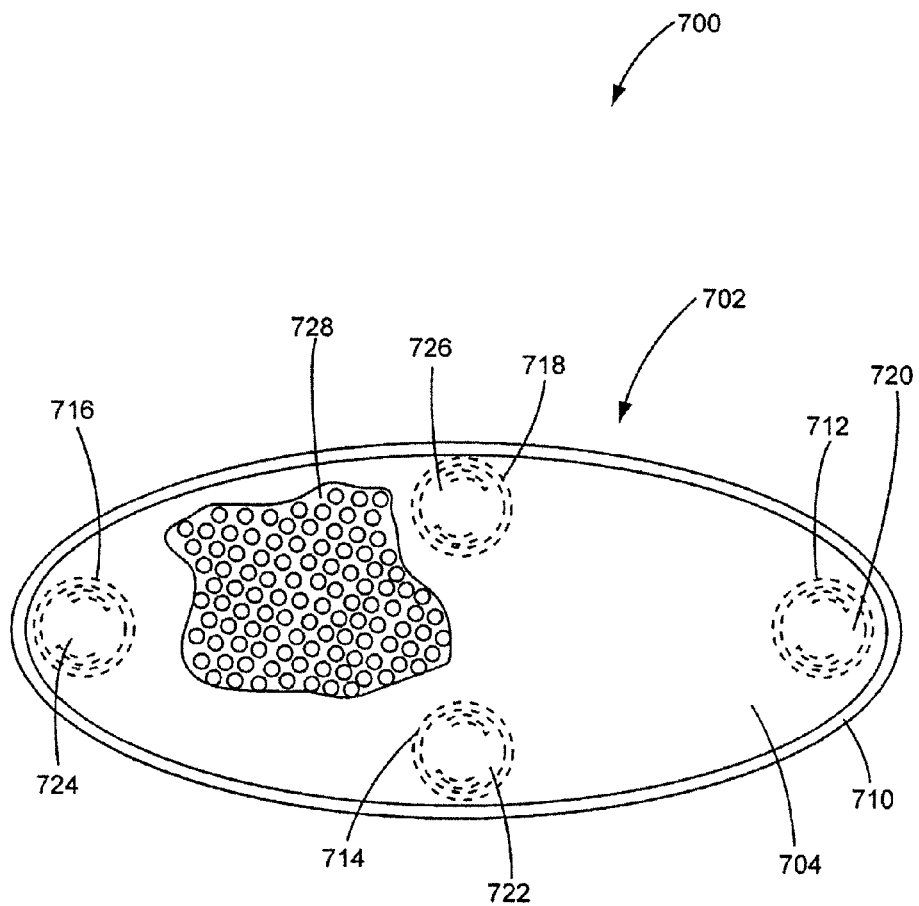
FIG. 8 is a schematic top view of the embodiment of FIG. 7.

FIG. 8 is a top view of the oval-shaped exercise step 700 of FIG. 7. As illustrated in FIG. 8, legs 712-718 are spaced around the periphery of the base 702 of the exercise step 700. The top surface 728 is a non-slip surface that can be constructed of a separate material, such as a cushioning material, to further add cushioning to the exercise step 700. As indicated above, the lip 710 provides a flush surface between the top 728 and the sidewall 708. Alternatively, the upper plate 704 can be formed with a non-slip surface, so as to eliminate a separate layer. Leg attachments 720, 722, 724, 726 are disposed in the lower plate and provide a latching mechanism to latch the legs 712-718 to the lower plate 706.

Figure 9:
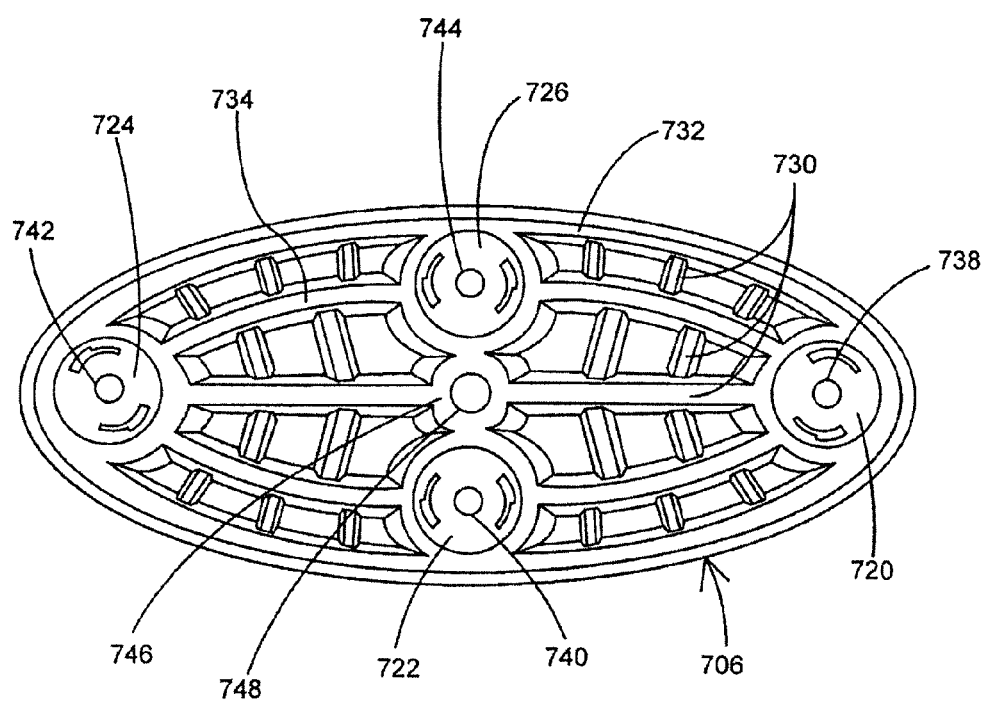
FIG. 9 is a schematic bottom view of the base of the exercise step of FIG. 7.

FIG. 9 is a bottom view of the lower plate 706 of the exercise step 700, illustrated in FIGS. 7 and 8. As illustrated in FIG. 9, the lower plate 706 has a plurality of spokes 730 that provides longitudinal support to the lower plate 706. In addition, rings 732, 734 provide circumferential support for the lower plate 706. The combination of the spokes 730 and rings 732-736 provide support for the lower plate 706, so that the amount of plastic material disposed in the lower plate 706 can be reduced. The reduction in the amount of plastic material in the lower plate 706 provides a great deal of savings in the construction of the exercise stool 700.

As also illustrated in FIG. 9, leg attachments 720, 722, 724, 726 are disposed in the lower plate 706. Flow regulators 738, 740, 742, 744 can simply comprise an opening in the lower plate 706, or a regulator of some type can be disposed in the opening. For example, a porous material may be placed in the openings of the flow regulators 738-744 to control the flow of air, as well as limit sounds created by the flow of air, such as whistling. Each of the flow regulators 738-744 are connected to the center ring 746 via spokes 730. Again, spokes 730 provide a dual function of providing both a support structure for the lower plate 706 and an air channel between the leg attachments 720-726 and the center ring 746. Center ring 746 includes a central air control regulator 748 that regulates the flow of air from the interior portion of the base 702 to the external environment. The central air control regulator 748 may comprise a control valve, a specially sized opening, or may include an opening with a porous material disposed in the opening that controls the amount of flow of air through the opening of the central air control regulator, as disclosed in more detail below.

Figure 10:
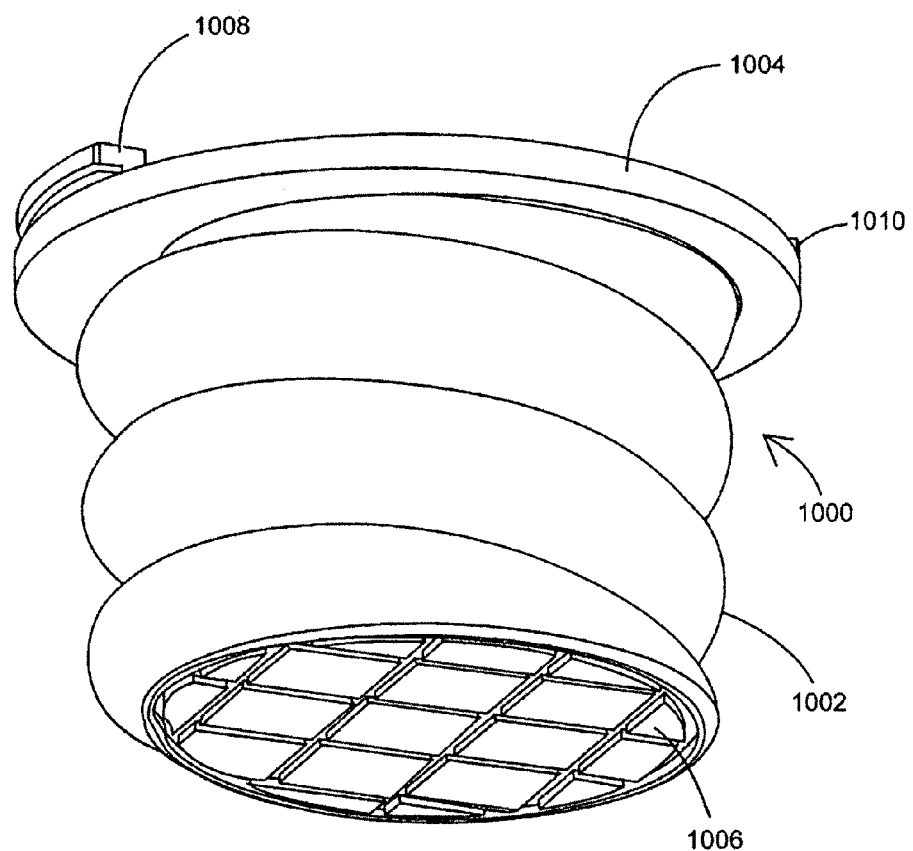
FIG. 10 is a schematic, perspective view of a clockwise spiral air-cushioning leg.

FIG. 10 is a schematic perspective view of a clockwise spiral leg 1000. As shown in FIG. 10, the clockwise spiral leg 1000 has a spiral body 1002 that comprises a single bulge that forms the sidewall of the clockwise spiral leg 1000, which has a spiral twist in a clockwise direction. A non-slip cover 1006 is attached to the lower portion of the spiral body 1002. Non-slip cover 1006 is intended to provide a non-slip surface for the clockwise spiral leg 1000. An attachment plate 1004 is connected to an upper portion of the spiral body 1002 of the clockwise spiral leg 1000. Latching flanges 1008, 1010 provide a latching mechanism for latching to the leg attachments on the bottom plate of the exercise stool.

The clockwise spiral leg 1000, that is illustrated in FIG. 10, can be constructed using injection molding techniques. The advantage of using a spiral body 1002 is that an inner rotating mold that is used in the formation of the spiral body 1002 can be removed by rotating the inner rotating mold to unscrew the inner rotating mold from the spiral body 1002, as disclosed in more detail below with respect to FIG. 17. The use of a spiral inner rotating mold simplifies the injection molding process and allows the air-cushioning legs to be quickly and easily constructed. The air-cushioning provided by the spiral body 1002 reduces the amount of plastic material required to support and cushion the exercise steps 100, 400 and 700.

Figure 11:
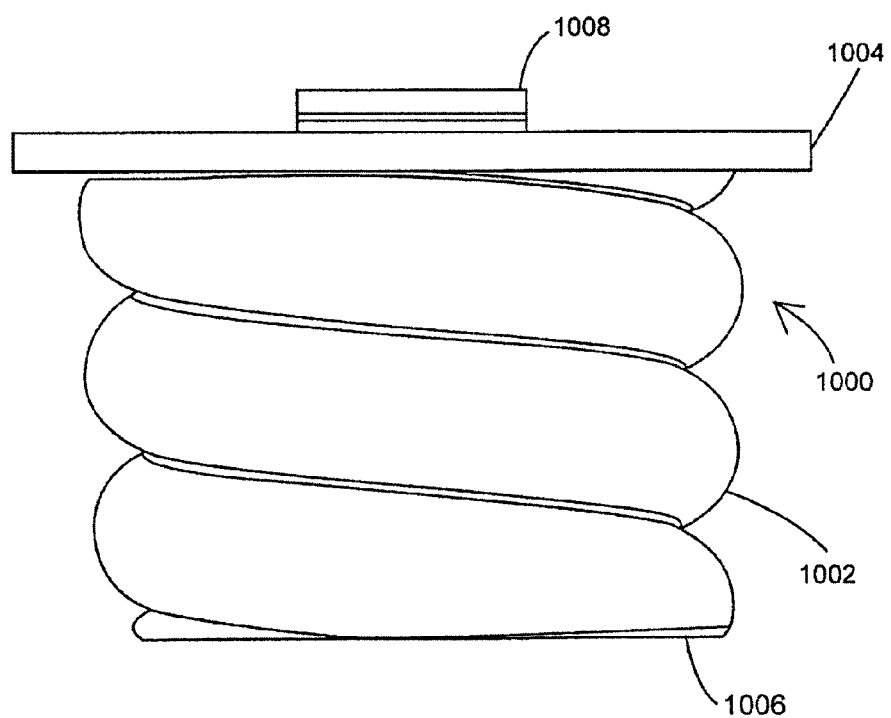
FIG. 11 is a side view of the embodiment of FIG. 10.

FIG. 11 is a side view of the clockwise spiral leg 1000. As shown in FIG. 11, the clockwise spiral leg 1000 has a spiral body or sidewall 1002 that forms a primary structural component of the clockwise spiral leg 1000. The spiral body or sidewall 1002 has a thickness and is made from a material that allows the spiral body 1002 to compress when a user steps on the exercise step. The spiral bulge is a single bulge that flexes outwardly to allow the spiral body 1002 to compress. As indicated above, the compression of the spiral body 1002 may cause a slight rotational creeping of the exercise step. For that reason, and as disclosed above, the clockwise and counter-clockwise spiral legs are attached to the lower plate in an alternating configuration to offset rotational creep. The non-slip cover 1006 provides an airtight seal to the bottom of the spiral body 1002 and provides a non-slip surface that reduces skidding of the clockwise spiral leg 1000. Attachment plate 1004 is formed together with the spiral body 1002 and provides an attachment surface for the clockwise spiral leg 1000 to the base 102 of the exercise step 100, as illustrated in FIG. 1, and other embodiments disclosed herein. Latching hinge 1008 is adapted to latch to the leg attachments, such as leg attachments 120-128, illustrated in FIG. 1, and provide a substantially airtight seal between the interior of the clockwise spiral leg 1000 and the base of the exercise step, such as base 102 of exercise step 100, as well as the other embodiments disclosed herein.

Figure 12:
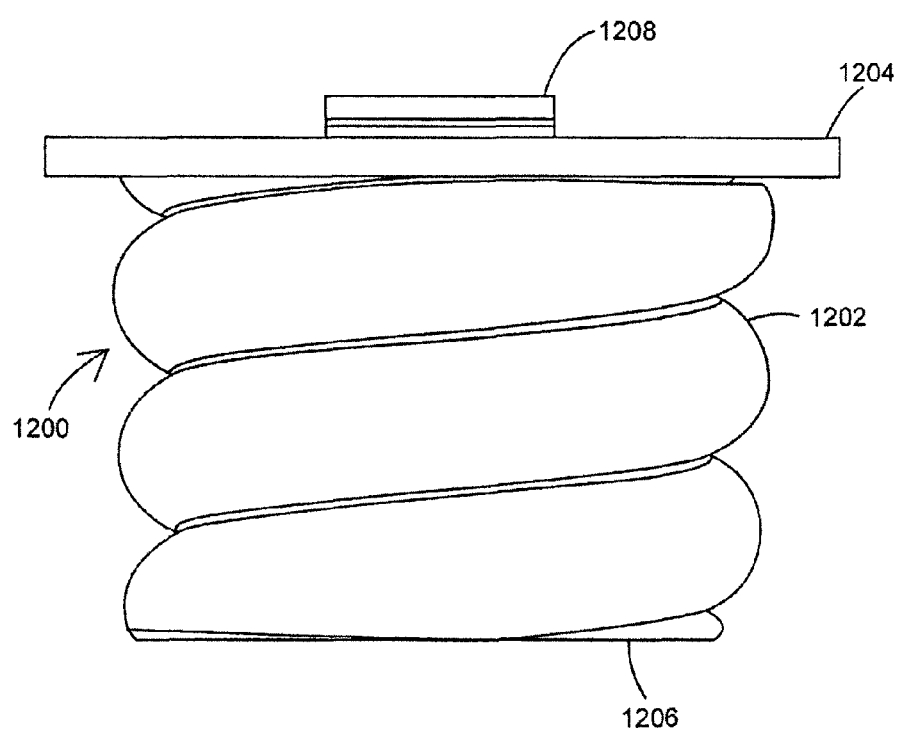
FIG. 12 is a side view of an embodiment of a counterclockwise spiral air-cushioning leg.

FIG. 12 is a side view of a counterclockwise spiral leg 1200. As shown in FIG. 12, the spiral body 1202 has a counterclockwise rotation that differs from the clockwise rotation of the spiral body 1002 illustrated in FIGS. 10 and 11. The counterclockwise spiral leg 1200 is otherwise the same as the clockwise spiral leg 1000. For example, nonskid cover 1206 is connected to the bottom portion of the spiral leg 1202 and provides an airtight seal along the bottom portion of the spiral body 1202. The attachment plate 1204 is formed together with the spiral body 1202, as well as latching flange 1208. The attachment plate 1204 forms a substantially airtight seal with the leg attachments of the base of the exercise step when the latching flange 1208 secures the counterclockwise spiral leg 1200 to the base of the exercise step.

Figure 13:
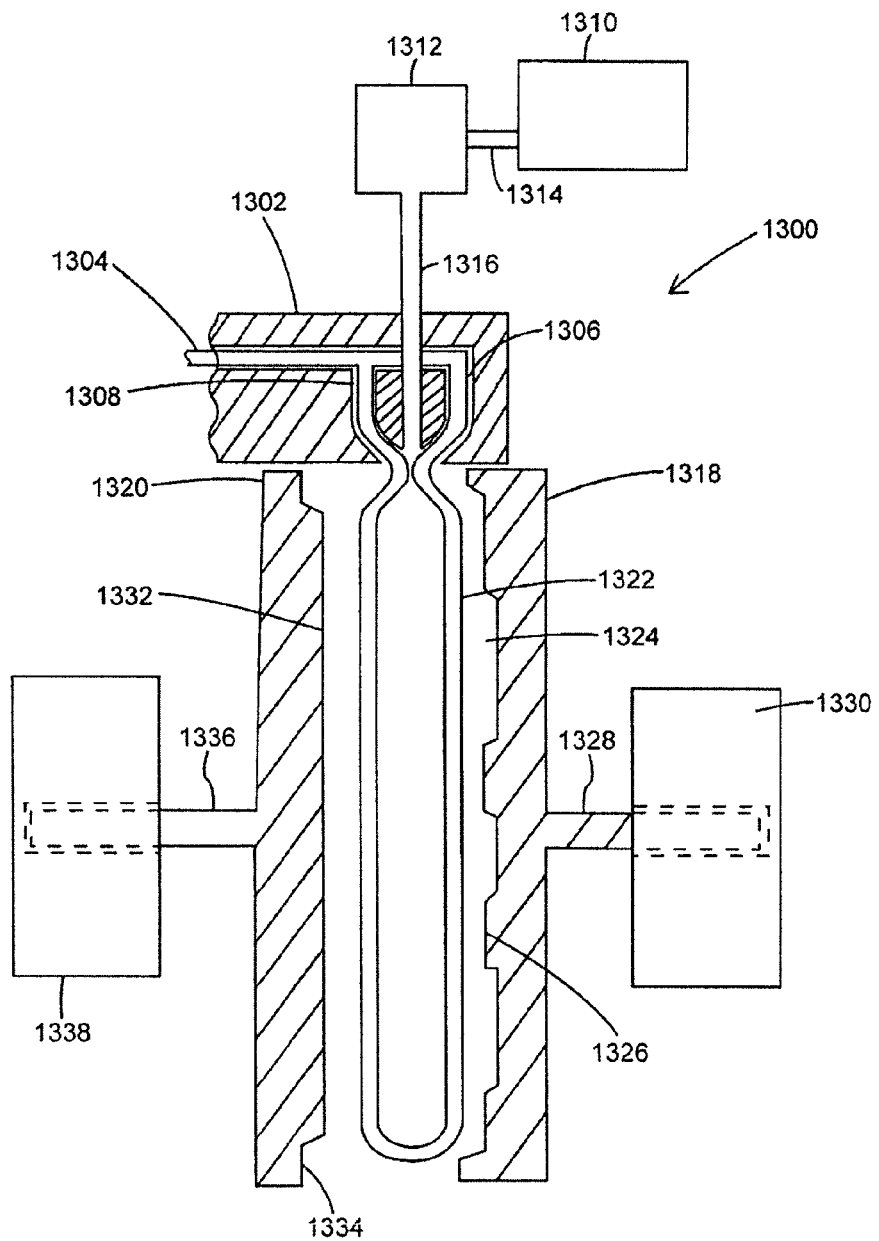
FIG. 13 is a schematic side cutaway view of an embodiment of a blow mold for forming the base of an exercise step illustrated in an open position.
Figure 14:
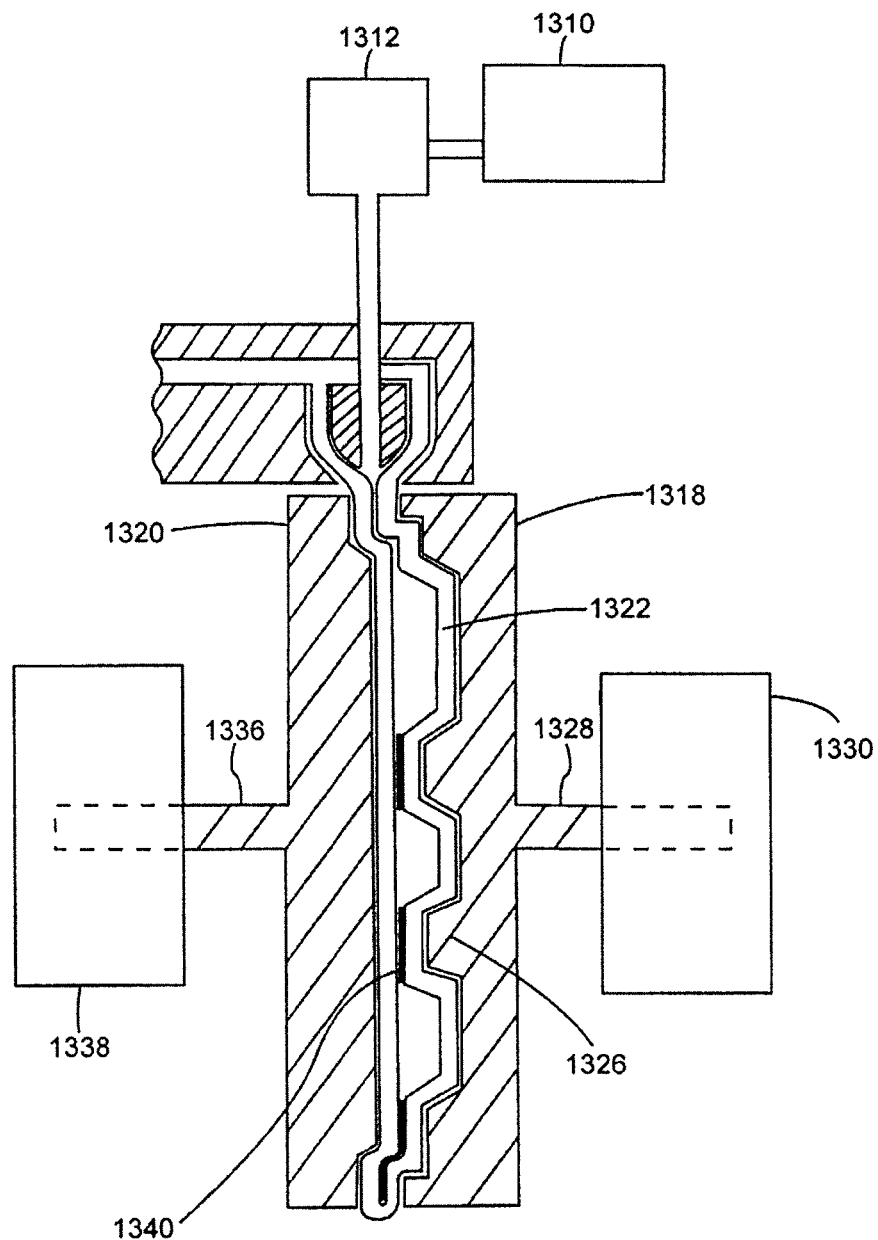
FIG. 14 is a schematic illustration of the embodiment of the blow mold of FIG. 13 in a closed position.

FIGS. 13 and 14 show partial cutaway views of one embodiment of a blow molding apparatus 1300 for forming the base for the exercise step, such as base 102 of exercise step 100, as illustrated in FIG. 1, and other embodiments disclosed herein. As shown in FIG. 13, an extruder head 1302 extrudes melted plastic 1304 through openings 1306, 1308 to form parison 1322. Air compressor 1310 generates compressed air, which is applied to a control valve 1312 via air tube 1314. Air tube 1316 allows air to be inserted in to the interior portion of parison 1322. Control valve 1312 controls the inflation of the parison 1322. Moveable molding plates 1318, 1320 provide a blow molding cavity for the parison 1322. Moveable molding plate 1320 has a flat surface 1332 that corresponds to the flat surface that is created for the upper plate of the exercise step, such as upper plate 130 of exercise step 100, illustrated in FIG. 1, and other embodiments disclosed herein. Indentation 1334 corresponds to a lip that is formed adjacent to the upper plate, such as lip 116 that is adjacent to upper plate 130, as shown in FIG. 1 and other embodiments disclosed herein. Moveable molding plate 1318 has a series of indentations, such as indentation 1324, as well as a series of protrusions, such as protrusion 1326. The moveable molding plate 1318 is driven inwardly toward moveable molding plate 1320 by way of piston controller 1330 and piston 1328. Similarly, moveable molding plate 1320 is driven inwardly by piston controller 1338 and piston 1336. As the moveable molding plates 1318, 1320 are driven inwardly, the parison 1322 is pushed inwardly to create a molded piece.

FIG. 14 is a schematic cutaway view of the blow mold of FIG. 13 in a closed position. As shown in FIG. 14, the parison 1322 conforms to the surface of the moveable molding plates 1318, 1320. The protrusions in moveable molding plate 1318, such as protrusion 1326, push the parison 1322 inwardly until plastic welds are formed between each of the interior sides of the parison 1322, such as plastic weld 1340, adjacent to the protrusions, such as protrusion 1326. The plastic welds that are created between the interior opposing sides of the parison 1322, such as plastic weld 1340, provide structural strength and integrity to the molded piece that forms the base of the exercise step. In addition, the various rings and spokes that are created by the alternating protrusions and indentations in moveable plate 1318, also provide additional structural rigidity to the lower plate, such as lower plate 131, illustrated in FIG. 1, as well as the other lower plates in the other embodiments disclosed herein. The additional structural rigidity and strength of the base, such as base 102 of exercise step 100, as well as the other embodiments disclosed herein, allow the amount of plastic material utilized in the base, such as base 102, to be reduced. The expense of the plastic materials used to form the molded pieces can be a significant portion of the expense of the overall cost of the exercise step. Hence, reduction in the amount of plastic material, while providing adequate structural support, can result in significant cost savings. For purposes of simplicity, one of the moveable plates 1318, 1320, can be fixed and non-moveable, while the other moveable molding plate can be moved to compress the parison 1322 in the manner illustrated in FIG. 14. Hence, one set of piston controllers 1330, 1338 and one set of pistons 1328, 1336 can be removed to reduce the cost of the blow mold 1300.

Figure 15:
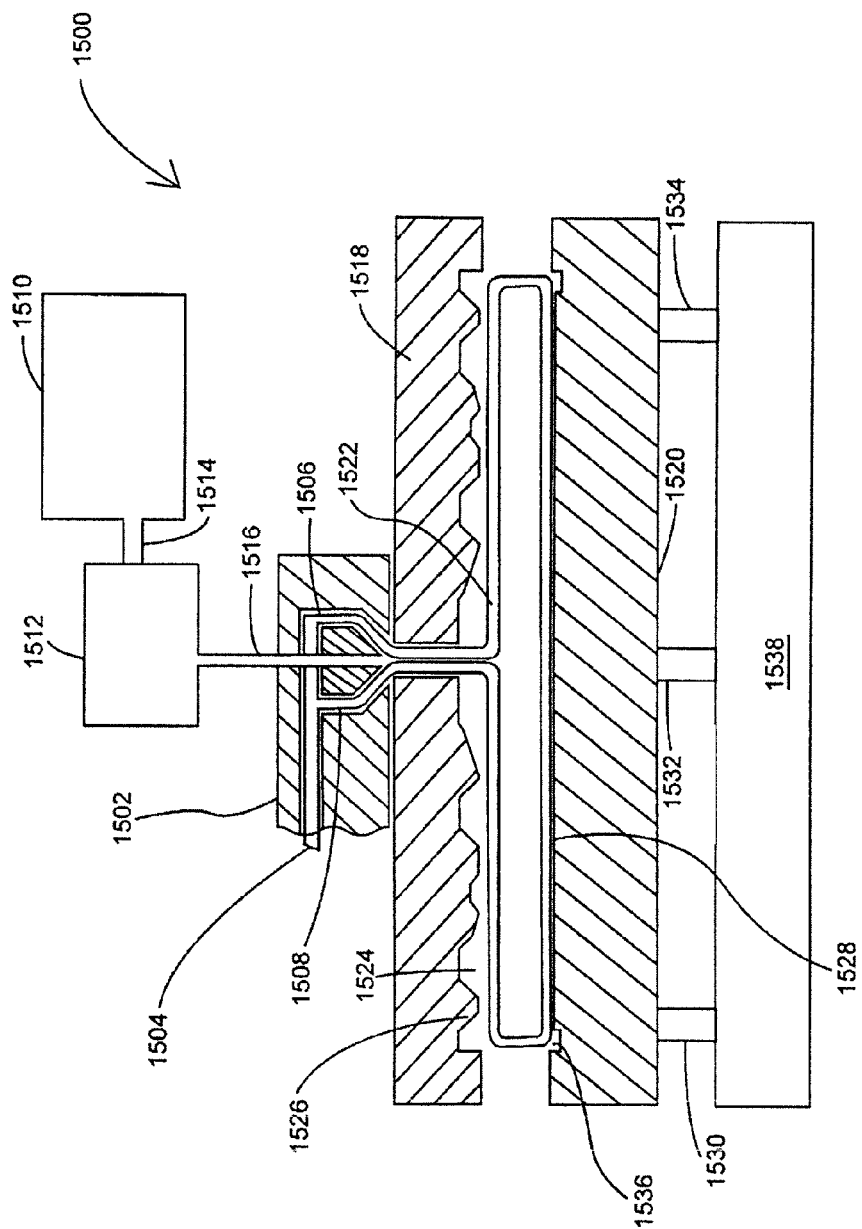
FIG. 15 is a schematic cutaway view of another embodiment of a blow mold.

FIG. 15 is a schematic cutaway view of another embodiment of a blow mold 1500. As illustrated in FIG. 15, the blow mold 1500 includes an extruder 1502 that extrudes the melted plastic 1504 to form a parison 1522. The melted plastic 1504 is extruded through openings 1506, 1508 and entered into a molding cavity through an opening, which is centrally located in molding plate 1518. Air compressor 1510 generates a supply of compressed air, which is applied to control valve 1512 via air tube 1514. Control valve 1512 controls the pressure that is applied to the parison via air supply 1516. Molding plate 1518 includes a series of protrusions, such as protrusion 1526 and a plurality of indentations, such as indentation 1524. Molding plate 1518 molds the lower plate of the exercise step. Moveable molding plate 1520 has a flat surface 1528 that corresponds to the flat upper surface of the upper plate of the exercise step, such as upper plate 130 of exercise step 100 of FIG. 1, and other upper plates of other embodiments disclosed herein. Indentation 1536 creates a lip in the upper plate, such as lip 116, illustrated in FIG. 1, and lips on other embodiments disclosed herein. Molding plate 1518 can either be a moveable plate, or can be fixed. Similarly, moveable molding plate 1520 can be moved by pistons 1530, 1532, 1534, which are attached to a piston controller 1538. Piston controller 1538 controls the movement of moveable molding plate 1520 to squeeze or compress the parison 1522.

Figure 16:
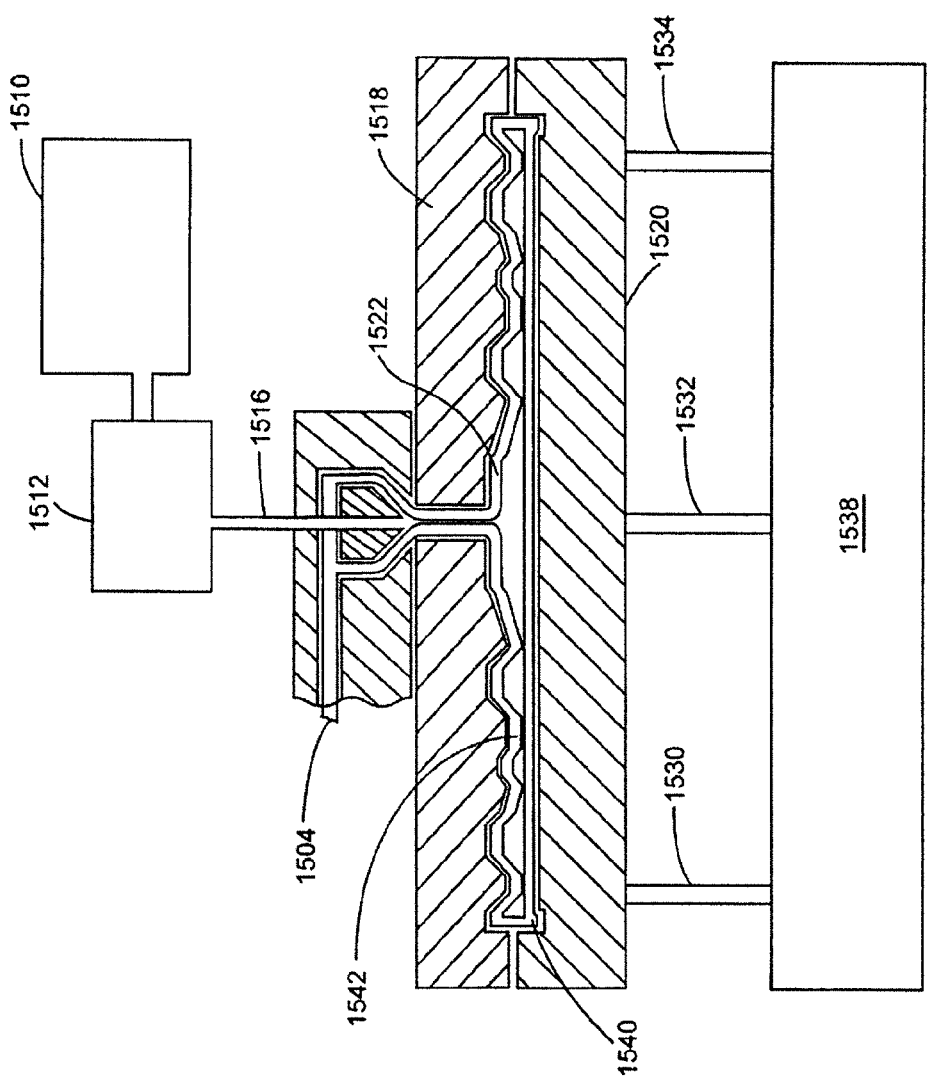
FIG. 16 is a schematic illustration of the blow mold of FIG. 15 in a closed position.

FIG. 16 is a schematic illustration of the blow mold 1500 in a closed position. As shown in FIG. 15, piston controller 1538 has extended the pistons 1530, 1532, 1534 to move the moveable molding plate 1520 towards the molding plate 1518. The air compressor 1510 supplies compressed air to the control valve 1512 that ensures that the proper inflation of the parison 1522 has occurred, so that the parison 1522 expands to the surfaces of both the molding plate 1518 and the moveable molding plate 1520 in the closed position, as shown in FIG. 16. A plurality of plastic welds are created between the opposing inner surfaces of the parison 1522 adjacent to the protrusions in the molding plate 1518, such as protrusion 1526. The indentations, such as indentation 1524, may comprise spokes, rings, or other supporting structures. In one embodiment, air passages are provided between a leg attachment and an inner ring via the indentations, such as indentation 1524. Again, the plastic welds, such as plastic weld 1542, provide additional structural rigidity and strength to the base 102 of exercise step 100, and other base portions of other embodiments disclosed herein. In addition, the spokes and rings and lip 1540 that are formed, by way of the indentations, such as indentation 1524 (FIG. 15), also add additional strength to the base of the exercise step, such as base 102 of exercise step 100, disclosed in FIG. 1, and other embodiments disclosed herein. The structural rigidity provided by the plastic welds and the spokes, rings and lip reduces the amount of plastic that is used in the base of the exercise step and reduces the overall cost of the exercise step, while still providing the same strength and rigidity.

Figure 17:
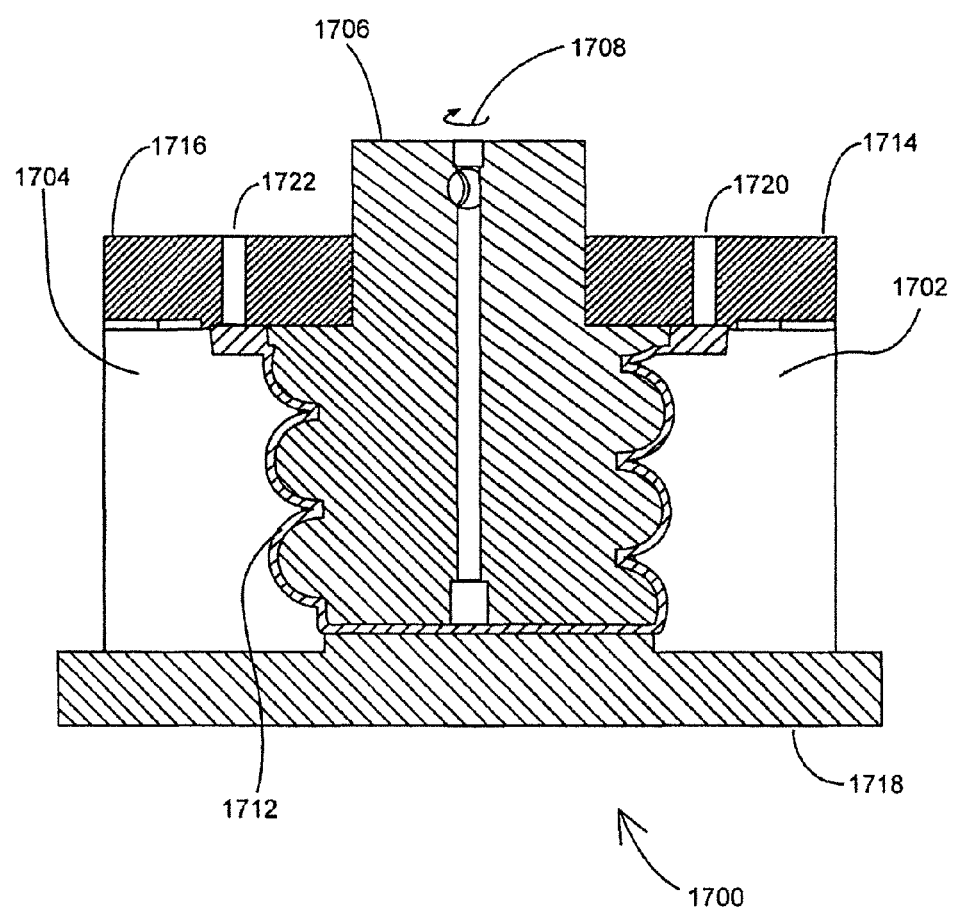
FIG. 17 is a sectional view of an injection mold for an air-cushioning leg.

FIG. 17 is a sectional view of an injection mold 1700 for an air-cushioning leg. As shown in FIG. 17, there are several outer mold pieces, i.e., outer side mold 1702, outer side mold 1704, outer upper mold 1714, outer upper mold 1716 and outer lower mold 1718. These outer molds surround the exterior portion of the molded piece 1712. An inner rotating mold 1706 is disposed in the interior portion of the outer molds 1702, 1704, 1714, 1716, 1718 and provides a gap between the inner rotating mold 1706 and the outer molds 1702, 1704, 1714, 1716, 1718 to form the molded piece 1712. The interior rotating mold 1706 has a spiral shape, so that the interior rotating mold 1706 can be removed from the molded piece 1712 by twisting the interior rotating mold 1706 in the rotational direction 1708, after removal of outer upper molds 1714, 1716. In other words, after the molded piece 1712 has cooled to a certain extent, and while the outer side molds 1702, 1704 and outer lower mold 1718 are in place and the outer upper molds 1714, 1716 have been removed, the inner rotating mold 1706 can be carefully rotated to remove the rotating interior mold 1706 out of the molded piece 1712. In that regard, the outer side molds 1702, 1704 and outer lower mold 1718 may be released to some extent to reduce some of the pressure created on the molded piece 1712, so that the interior rotating mold 1706 can be more easily removed. In addition, injection openings 1720, 1722 provide openings to insert the heated plastic under pressure into the injection mold 1700 to form the molded piece 1712.

Figure 18:
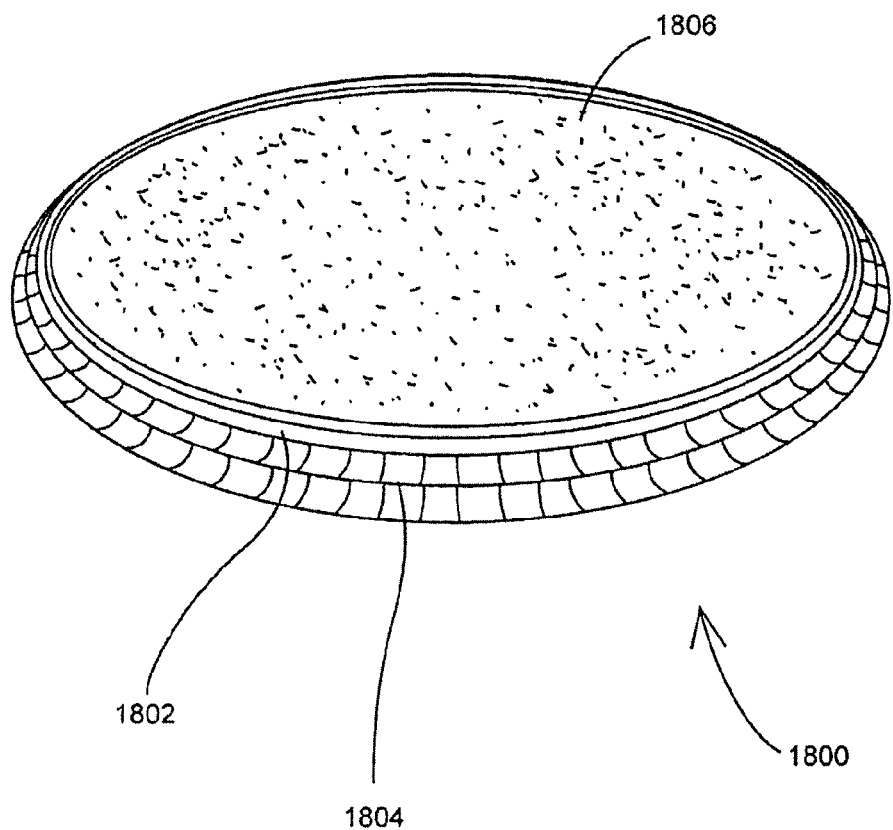
FIG. 18 is a schematic perspective view of a flow regulator.

FIG. 18 is a schematic perspective view of a flow regulator 1800. As shown in FIG. 18, the flow regulator 1800 has a frame 1802 with a recessed portion 1804. The recessed portion 1804 is recessed to engage an opening that comprises the flow regulator opening, such as flow regulators 1456-1462 that have an opening in the lower plate 408 of base 402, as illustrated in FIG. 6, and the other embodiments disclosed herein. Additionally, the flow regulator 1800, illustrated in FIG. 18, can also function as a central control regulator, such as central control regulator 464, illustrated in FIG. 6, and other embodiments disclosed herein. The flow regulator 1800 has a porous insert 1806 that controls the flow of air through the flow regulator 1800 and also reduces noise of air that flows through the flow regulator 1800. The porosity of the porous insert 1806 controls the rate of flow of air through the flow regulator 1800 for any given air pressure differential between interior portions of the base of the exercise step and the outer atmosphere.

Figure 19:
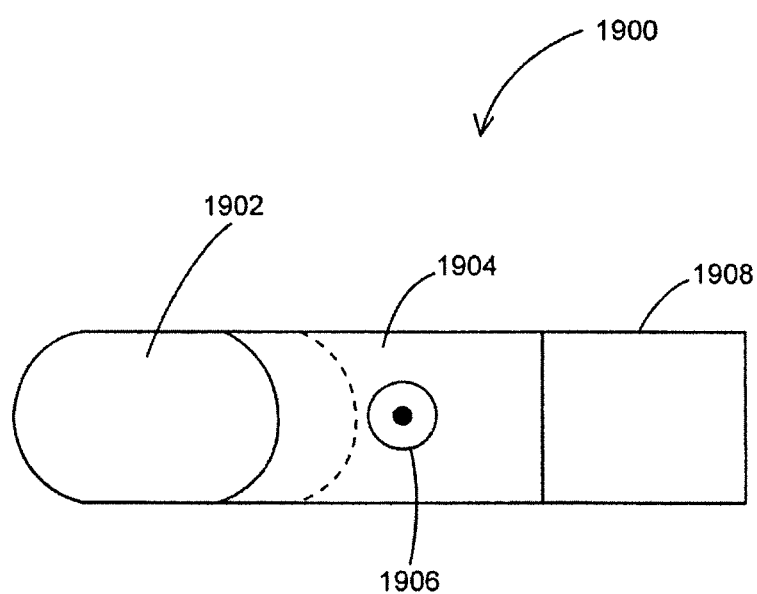
FIG. 19 is a schematic diagram of an embodiment of an air control regulator.

FIG. 19 is a schematic diagram of an embodiment of an air control regulator 1900. As shown in FIG. 19, a slide cover 1904 is mounted in a slide 1908. Slide cover 1904 has a handle 1906, which allows the movement of slide cover 1904 on the slide 1908. The slide cover 1904 can be moved to adjust the size of the opening 1902. In addition, a porous material, such as a foam, can be mounted in the opening 1902 to reduce noise of air flow through the opening 1902. The air control regulator 1900 can be disposed in the center of the bottom plate. The air control regulator 1900 can also be used as a flow regulator in the leg attachments to control the flow of air from each of the air-cushioning legs.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of making an exercise step comprising:
   forming a plurality of clockwise air-cushioning legs comprising:
      forming a first sidewall having a clockwise spirally shaped bulge that allows said clockwise air-cushioning leg to compress when a user steps onto said exercise step;
      attaching a first non-slip cover to a bottom portion of said first sidewall to form an airtight seal with said bottom portion of said first sidewall;
      forming a first attachment plate that is connected to an upper portion of said first sidewall having latches for attaching said clockwise air-cushioning legs to said exercise step;
   forming a plurality of counterclockwise air-cushioning legs comprising:
      forming a second sidewall having a counterclockwise spirally shaped bulge that allows said counterclockwise air-cushioning leg to compress when a user steps onto said exercise step;
      attaching a second non-slip cover to a bottom portion of said second sidewall to form an airtight seal with said bottom portion of said second sidewall;
      forming a second attachment plate that is connected to an upper portion of said second sidewall having latches for attaching said counterclockwise air-cushioning legs to said exercise step;
   forming a base comprising:
      forming an upper plate from a parison in a blow molding process;
      forming a lower plate from said parison in said blow molding process comprising:
      forming a plurality of curved rings in said lower plate that provide circumferential support to said lower plate;
         forming a plurality of spokes in said lower plate that inter-connect said plurality of curved rings to provide lateral support to said lower plate, said plurality of spokes also providing a plurality of air flow passages;
      forming leg attachments in said lower plate that allow said latches on said first attachment plate and said second attachment plate to connect said air-cushioning legs to said lower plate with a substantially airtight seal;
      placing adjustable flow regulators on a first set of openings in said leg attachments that allow air in said clockwise air-cushioning legs and said counterclockwise air-cushioning legs, that is compressed when said user steps onto said exercise step, to be individually and separately controlled from said clockwise and counterclockwise air cushioning legs through said first set of openings in said leg attachments;

placing an air control regulator in said lower plate that is communicatively coupled to said air flow passages that collectively controls air flow from said air flow passages; and welding recessed portions of said lower plate to said upper plate to strengthen and form said air passages in said spokes.

* * * * *